United States Patent [19]

Watanabe et al.

[11] Patent Number: 5,098,783
[45] Date of Patent: * Mar. 24, 1992

[54] MAGNETIC RECORDING MEDIUM HAVING A BACKCOAT LAYER COMPRISING NON-MAGNETIC PARTICLES DISPERSED IN A VINYL COPOLYMER CONTAINING A DIALKYLAMINOALKYL GROUP

[75] Inventors: Hideomi Watanabe; Tsutomu Okita, both of Kanagawa, Japan

[73] Assignee: Fuji Photo Film Co., Ltd., Kanagawa, Japan

[ * ] Notice: The portion of the term of this patent subsequent to Nov. 14, 2006 has been disclaimed.

[21] Appl. No.: 228,421

[22] Filed: Aug. 5, 1988

[30] Foreign Application Priority Data

Aug. 5, 1987 [JP] Japan .................... 62-196066

[51] Int. Cl.⁵ ............................. G11B 5/00
[52] U.S. Cl. ............................ 428/323; 428/336; 428/402; 428/424.6; 428/694; 428/900
[58] Field of Search ............... 428/900, 694, 323, 336, 428/402, 424.6

[56] References Cited

U.S. PATENT DOCUMENTS

| | | | |
|---|---|---|---|
| 4,328,935 | 5/1982 | Steel | 242/192 |
| 4,556,611 | 12/1985 | Nakajima | 428/694 |
| 4,734,330 | 3/1988 | Oiyama et al. | 428/411.1 |
| 4,770,941 | 9/1988 | Imai et al. | 428/411.1 |
| 4,784,913 | 11/1988 | Nakamura | 428/411.1 |
| 4,880,692 | 11/1989 | Ryoke et al. | 428/323 |
| 4,880,693 | 11/1989 | Ryoke et al. | |
| 4,886,703 | 12/1989 | Hasumi et al. | |

FOREIGN PATENT DOCUMENTS 58-179936  4/1982  Japan .
59-175024  3/1983  Japan .

Primary Examiner—Merrell C. Cashion, Jr.
Assistant Examiner—Stevan A. Resan
Attorney, Agent, or Firm—Sughrue, Mion, Zinn Macpeak & Seas

[57] ABSTRACT

A magnetic recording medium comprising a non-magnetic support having on one surface thereof a magnetic layer and on the opposite surface thereof a backing layer comprising non-magnetic particles dispersed in a binder containing a copolymer of (a) at least one of a vinyl monomer containing a dialkylaminoalkyl group and a vinyl monomer containing a quaternary salt of a dialkylaminoalkyl group, and (b) a copolymerizable vinyl monomer.

9 Claims, No Drawings

MAGNETIC RECORDING MEDIUM HAVING A BACKCOAT LAYER COMPRISING NON-MAGNETIC PARTICLES DISPERSED IN A VINYL COPOLYMER CONTAINING A DIALKYLAMINOALKYL GROUP

FIELD OF THE INVENTION

The present invention relates to a magnetic recording medium which is provided with a backing layer.

BACKGROUND OF THE INVENTION

A magnetic recording medium is widely used for recording electromagnetic signals, and various shapes such as a tape, a disk or a card are used. A magnetic recording medium tape is used for audio recording, video recording and for computers (hereinafter, a magnetic recording medium tape is simply referred to as "magnetic tape").

Among magnetic tapes, tapes for audio and video recording are often enclosed in a cassette for use. Recently, a long recording time has been required for a magnetic tape enclosed in a cassette. Accordingly, there is a tendency for a magnetic tape to be made thinner and thinner, so that a tape which is as long as possible can be enclosed in a predetermined standard cassette.

In this connection, a magnetic tape provided with a backing layer has been developed and widely used to provide such a thin magnetic tape with strength and further to improve running efficiency by improving contact between the back surface of a magnetic tape and the running system of reproducing apparatus.

A backing layer generally comprises non-magnetic particles dispersed in a binder. The surface of the backing layer should not be uneven, to improve the running efficiency of a magnetic tape. That is, when the surface of the backing layer is extremely smooth, the area contacting the running system increases and the friction coefficient also increases, thereby decreasing the running efficiency of the magnetic tape. On the other hand, when unevenness is extremely great on the surface of the backing layer, upon preparing a magnetic tape, particularly in the step of heat treatment of a wound magnetic tape, unevenness on the surface of the backing layer prints through the magnetic layer contacting the surface of the backing layer (that is, notable unevenness is formed on the surface of the magnetic layer), thereby decreasing the electromagnetic characteristic of the magnetic tape. Accordingly, it is necessary not only to adjust the particle size distribution of non-magnetic particles but also to improve dispersibility of non-magnetic particles in a binder upon preparing a backing layer.

The effects of a binder upon surface properties of a backing layer have been studied, and it is disclosed, for example, in JP-A-56-98719 and U.S. Pat. No. 4,367,261 that a preferred binder for a backing layer is a combination of cellulose type resin, thermoplastic polyurethane elastomer and polyisocyanate. (The term "JP-A" as used herein used means an unexamined published Japanese patent application).

Such a binder is preferred with respect to the efficiency of a backing layer. However, there is a handling problem. Since nitrocellulose, which is the most typical cellulose resin, becomes explosive depending upon the handling conditions, particular attention must be paid in preparing a backing layer.

A polyurethane resin and a vinyl chloride type resin are used in combination as a binder to avoid using nitrocellulose. However, in the above binder system, dispersibility of non-magnetic particles is deteriorated, and thus unevenness on the surface of a backing layer tends to be extreme, resulting in deteriorated electromagnetic characteristics of the magnetic tape. There is also a problem that the thus-formed backing layer is fragile, so that cracks tend to take place and the edge of the tape tends to break.

There is also another problem that the surface electric resistance on a tape is high, because various materials used for preparing the tape are electrically insulating. That is, due to friction and the like, a magnetic tape is charged, and as a result, dust and contaminants easily attach to the surface of the tape, thereby causing drop outs; static friction coefficient increases, thereby disturbing the wound shape of a magnetic tape; and running properties deteriorate.

To avoid the above defects, it is proposed to reduce the surface electric resistance of a magnetic tape by adding electroconductive substances such as carbon black to a magnetic layer, and to add anion, cation, nonionic and amphoteric surface active agents. But, addition of excess amounts of electroconductive substances results in reducing magnetic flux density as well as sensitivity of a magnetic recording medium, and addition of excess amounts of surface active agents results in deteriorated running properties and increased viscosity of a tape.

SUMMARY OF THE INVENTION

An object of the present invention is to provide an improved long play magnetic tape provided with a backing layer.

Another object of the present invention is to provide a magnetic tape which is unlikely to be electrostatically charged upon running and is free from problems caused by electrostatic charging.

Another object of this invention is to provide a magnetic tape having excellent running properties and electromagnetic properties.

It has now been found that these and other objects of this invention can be attained by a magnetic recording medium comprising a non-magnetic support having on one surface thereof a magnetic layer and on the opposite surface thereof a backing layer comprising non-magnetic particles dispersed in a binder containing a copolymer of (a) at least one of a vinyl monomer containing a dialkylaminoalkyl group and a vinyl monomer containing a quaternary salt of a dialkylaminoalkyl group, and (b) a copolymerizable vinyl monomer.

DETAILED DESCRIPTION OF THE INVENTION

Since the above copolymer has high affinity with non-magnetic particles, the dispersibility of non-magnetic particles increases, and as a result, the surface of the backing layer provided on the non-magnetic support is smooth and thus running properties are excellent.

Preferred vinyl monomer having a dialkylaminoalkyl group for use in this invention are represented by the following formulae (I), (II) and (III):

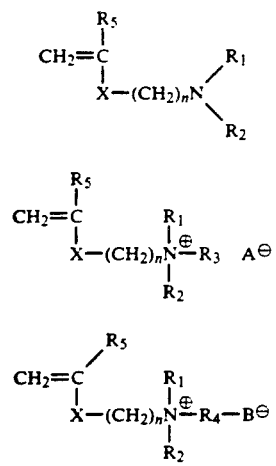

(I)

(II)

(III)

wherein $R_1$, $R_2$, and $R_3$, which may be the same or different, each represents an alkyl group containing from 1 to 6, preferably from 1 to 4, carbon atoms; $R_4$ represents an alkylene group containing from 1 to 6, preferably from 1 to 4, carbon atoms; $R_5$ represents hydrogen or $CH_3$; X represents $-CO_2-$, $-CONH-$, $-NHCONH-$ or $-NHCO_2-$; $A^\ominus$ represents $Cl^\ominus$, $Br^\ominus$, $OPO_3R_6^\ominus$, $OSO_3R_6^\ominus$ or $NO_3^\ominus$; $R_6$ represents an alkyl group containing from 1 to 6, preferably from 1 to 4, carbon atoms; $B^\ominus$ represents $-CO_2^\ominus$ or $-OPO_3^\ominus$; and n is an integer of from 1 to 6, preferably from 1 to 4.

The copolymer binder used in the present invention is a copolymer of at least one of the above vinyl compounds and a copolymerizable vinyl compound Y, and is represented by the following formulae (Ia), (IIa) or (IIIa)

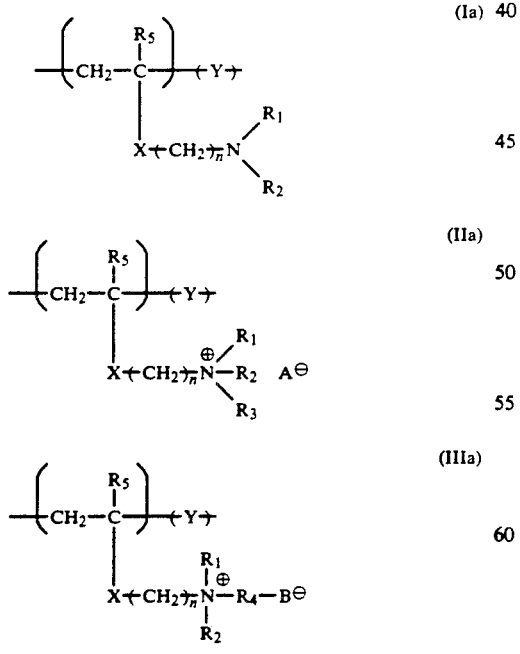

(Ia)

(IIa)

(IIIa)

It is illustrated that each monomer consisting of a compound in the above formulae aligned in this regular order, but some monomers may be aligned regularly and may be repeated regularly, or each monomer may be aligned at random.

The vinyl monomer having a dialkylaminoalkyl group, and vinyl monomer having a quaternary salt of a dialkylaminoalkyl group and Y may be a mixture of at least two kinds each.

The vinyl monomer having a dialkylaminoalkyl group is preferably bonded to the main chain through $-CO_2-$ and $-CONH-$, and particularly preferred examples are as follows:

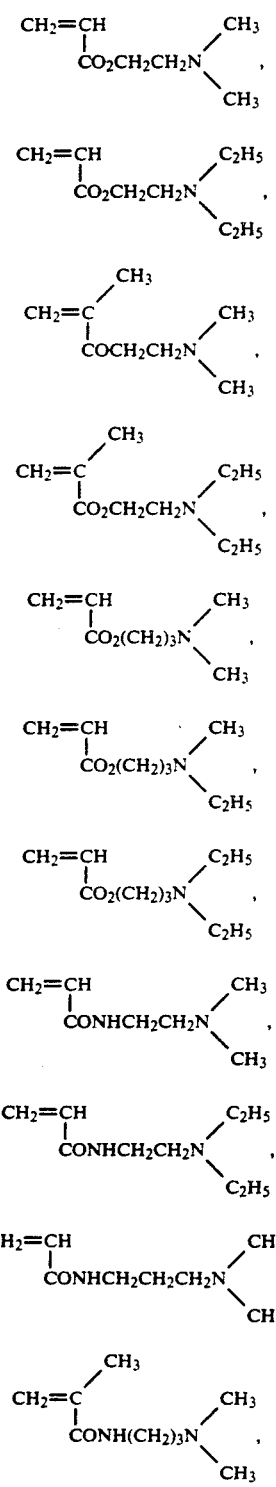

-continued

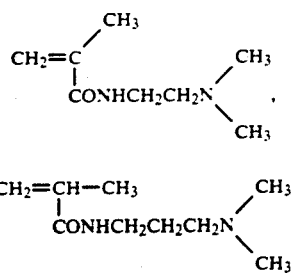

Preferred examples of the vinyl monomer having a quaternary salt of a dialkylamino alkyl group are shown below.

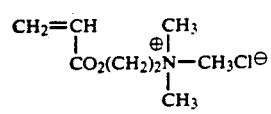

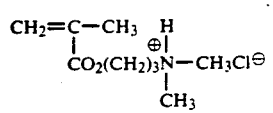

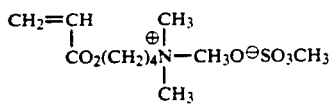

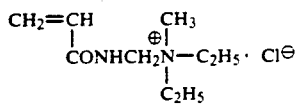

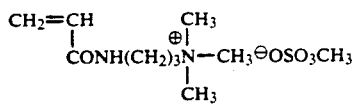

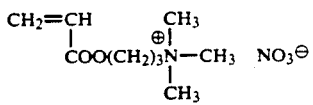

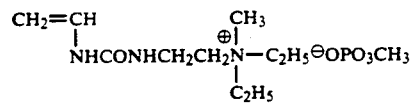

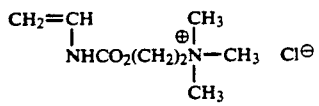

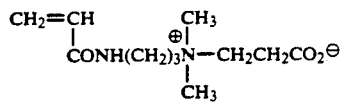

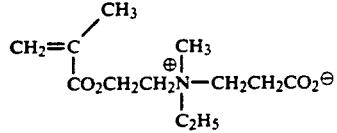

The copolymerizable vinyl monomer represented by Y in the above formulae is a monomer having at least one copolymerizable vinyl group selected from vinyl acetate, vinyl alcohol, maleic acid, maleic anhydride, acrylic acid, acrylates, methacrylic acid, methacrylates, acrylates having a glycidyl group, methacrylates having a glycidyl group, acrylonitrile, vinyl chloride, vinylidene chloride and vinyl propionate. Among these monomers, acrylates, vinyl acetate, methacrylates, acrylonitrile, vinylidene chloride, acrylates having a glycidyl group, and methacrylates having a glycidyl group are preferred.

The vinyl monomer having a dialkylaminoalkyl group or a quaternary salt of the dialkylaminoalkyl group is present in an amount of from about 0.5 to 50 wt %, preferably from 1 to 40 wt %, and more preferably from 2 to 30 wt % in the copolymer.

At least two kinds of vinyl monomers having dialkylaminoalkyl groups or their quaternary salts can be copolymerized to improve solubility, film properties and adhesiveness of a support.

The molecular weight of the copolymer is preferably from 10,000 to 50,000, more preferably from 15,000 to 30,000. The copolymer may be a straight-chain or branched polymer and soluble in an organic solvent.

The copolymers according to the present invention can be prepared by conventional methods such as bulk polymerization, solution polymerization, emulsion polymerization, suspension polymerization, etc. as described, e.g., in *Kobunshi Gosei no Jikkenho* (Experimentals for Polymer Synthesis) by Ohtsu et al (Kagaku Dojin, Japan 1972), *Preparation Method of Polymer Chemistry* by Solenson et al (John Willy & Sons 1968) and *Jushukugo to Jufuka Hanno* (Polycondensation and Polyaddition Reaction) edited by Polymer Association Japan (Kyokitsu Shuppan, Japan 1981).

The above vinyl copolymer is contained in a ratio of preferably from about 5 to 90 wt %, more preferably from 20 to 80 wt % of the total binder in the backing layer.

The above compound may be used in combination with other binders, including those conventionally known as binders for a magnetic recording medium, such as a copolymer of vinyl chloride and vinyl acetate; a copolymer of vinyl chloride, vinyl acetate and vinyl alcohol; a copolymer of vinyl chloride, vinyl acetate and maleic acid; a copolymer of vinyl chloride and vinylidene chloride; a copolymer of vinyl chloride and acrylonitrile; a copolymer of acrylate and acrylonitrile; a copolymer of acrylate and vinylidene chloride; a copolymer of methacrylate and vinylidene chloride; a copolymer of methacrylate and styrene; a thermoplastic polyurethane resin; a phenoxy resin; a polyvinyl fluoride; a copolymer of vinylidene chloride and acrylonitrile; a copolymer of butadiene and acrylonitrile; a copolymer of acrylonitrile, butadiene and methacrylic acid; polyvinylbutyral; a cellulose derivative; a copolymer of styrene and butadiene; a polyester resin; a vinyl chloride resin, a phenol resin; an epoxy resin; a polyurethane resin; a urea resin; a melamine resin; an alkyd resin; a urea-formaldehyde resin; or a mixture thereof. When the above compound is used in combination with a polyester resin or polyurethane resin, durability and running properties can remarkably be improved and performances of a magnetic recording medium are improved. Further, the durability can further be improved, if a tri-functional isocyanate compound such as a reaction product of 1 mol of trimethylol propane and 3 mol of tolylene diisocyanate is used in combination.

The backing layer of a magnetic tape of this invention comprises non-magnetic particles dispersed in a predetermined binder.

Examples of non-magnetic particles include carbon black, graphite and inorganic filling materials. Those may be used alone or in combination.

Specific examples of inorganic filling materials include $TiO_2$, $TiO$, $ZnO$, $CaCO_3$, $CaO$, $SnO_2$, $SiO_2$, $\alpha$-$Al_2O_3$, $ZnS$, $MoS_2$, $BaSO_4$, $CaSO_4$, $MgCO_3$, $BN$, $SiC$, $\alpha$-$Fe_2O_3$, and $Cr_2O_3$. Among those non-magnetic particles, carbon black, graphite, $ZnO$, $TiO_2$, $BaSO_4$ and $CaCO_3$ are preferred.

Particle sizes and shapes of non-magnetic particles are not particularly limited, and those conventionally used can also be used in this invention.

For example, when carbon black is used, it is desirable that carbon black having an average particle size of from 10 to 300 m$\mu$ is used. When inorganic filling materials are used, filling materials having an average particle size of from 0.1 to 10 $\mu$m are preferred.

Various shapes of non-magnetic particles such as a spherical shape, an acicular shape, a tabular shape or a cube shape can be used. Among these, those having a spherical shape or a chain-like shape are preferred.

The organic solvents for use in a coating composition for a backing layer include ketones such as acetone, methyl ethyl ketone, methyl isobutyl ketone or cyclohexanone; esters such as methyl acetate, ethyl acetate, butyl acetate, ethyl acetate or monoethyl ether of glycol acetate; ethers such as ethyl ether, glycol dimethyl ether, glycol monoethyl ether, dioxane or tetrahydrofuran; aromatic hydrocarbons such as benzene, toluene or xylene; and chlorinated hydrocarbons such as methylene chloride, ethylene chloride, carbon tetrachloride, chloroform, ethylene chlorohydrin or dichlorobenzene.

A backing layer is prepared by any conventional method of dispersing or dissolving non-magnetic particles of carbon black and/or inorganic filling materials, resins and, if desired, additives such as an antistatic agent in an organic solvent to prepare a coating composition, coating the coating composition on a surface of a support, drying it to evaporate the solvent and hardening the resin.

The backing layer is provided so that the thickness of the backing layer of a magnetic tape is generally 3 $\mu$m or lower. The backing layer using the binder of this invention preferably has a thickness of from 0.1 to 1.5 $\mu$m, more preferably from 0.2 to 1.2 $\mu$m. In case of a home video tape or an audio tape, if the thickness of the backing layer is 1.5 $\mu$m or higher, the tape tends to curl.

The order of providing a magnetic layer and a backing layer on a support is optional and both layers may be provided simultaneously. Particularly in this invention, it is desirable that both layers are provided simultaneously on a support.

For providing the backing layer according to the present invention, methods described in JP-B-56-26890 and U.S. Pat. No. 3,761,311 can be used. (The term "JP-B" used herein means an "examined Japanese patent publication").

A lubricating agent may be added to a backing layer of the magnetic tape of this invention. The lubricating agent is added in a backing layer by dissolving or dispersing the lubricating agent in a coating composition for a backing layer; by coating a solution of a lubricating agent and an organic solvent on a backing layer and then drying it; and by coating a solution of an lubricating agent and an organic solvent on a surface of a magnetic layer and contacting the magnetic layer with the above backing layer.

The lubricating agents include organic compounds such as higher fatty acids, metal soaps, higher fatty acid amides, higher fatty acid esters, mineral oil, or fat and oil, silicon oil, inorganic particles, plastic particles, $\alpha$-olefin polymers and fluorocarbons and mixtures thereof. Among those agents, lubricating agents mainly composed of higher fatty acids or higher fatty acid esters are preferred. Higher fatty acids and higher fatty acid esters having 12 or more total carbon atoms are preferred, and particularly fatty acids having from 12 to 18 carbon atoms and esters of the above fatty acids and alcohols having from 1 to 12 carbon atoms are preferred.

The amount of the lubricating agent is preferably from about 0.1 to 10 parts by weight per 100 parts by weight of the carbon black contained in the backing layer.

The ferromagnetic particles for use in the magnetic layer of this invention include ferromagnetic iron oxide particles, Co-doped ferromagnetic iron oxide particles, ferromagnetic chromium dioxide particles, ferromagnetic alloy particles, and barium ferrite. The aspect ratios of ferromagnetic iron oxide and chromium dioxide are about 3/1 to 30/1, preferably 5/1 or higher, and the average length thereof is from about 0.2 to 2.0 $\mu$m. Ferromagnetic alloy particles have a metal content of 75 wt % or higher, and 80 wt % or higher of the metal content is a ferromagnetic metal (i.e., Fe, Co, Ni, Fe-Ni, Co-Ni, Fe-Co-Ni) and the long diameter is 1.0 $\mu$m or lower.

The binders used in the magnetic layer are conventionally known thermoplastic resins, thermosetting resins, resins cross-linkable by radiation exposure such as electron beam exposure, and mixtures thereof.

The thermoplastic resins are those having a softening point of 150° C. or lower, an average molecular weight of from 10,000 to 200,000 and a degree of polymerization of from about 200 to 2,000, such as, for example, copolymers of vinyl chloride and vinyl acetate; copolymers of vinyl chloride and vinylidene chloride; copolymers of vinyl chloride and acrylonitrile; copolymers of acrylate and acrylonitrile; copolymers of acrylate and vinylidene chloride; copolymers of acrylate and styrene; copolymers of methacrylate and acrylonitrile; copolymers of methacrylate and vinylidene chloride; copolymers of methacrylate and styrene; urethane elastomers; polyvinyl fluoride; copolymers of vinylidene chloride and acrylonitrile; copolymers of butadiene and acrylonitrile; polyamide resins; polyvinyl butyral; cellulose derivatives (cellulose acetate butyrate, cellulose diacetate, cellulose triacetate, cellulose propionate, nitrocellulose and the like); copolymers of styrene and butadiene; polyester resins; various synthetic rubber thermoplastic resins (polybutadiene, polychloroprene, polyisoprene, copolymers of styrene and butadiene and the like); or mixtures thereof.

For the materials, the constitution and the preparation of the magnetic layer which can be used in the present invention, those described e.g., in U.S. Pat. Nos. 3,470,021, 3,387,993 and 4,018,967 can be used.

The materials for a non-magnetic support for use in this invention are conventional, and include polyesters such as polyethylene terephthalate, or polyethylene 2,6-naphthalate; polyolefins such as polyethylene or polypropylene; cellulose derivatives such as cellulose triacetate; plastics such as polycarbonates, polyimides or polyamide imides; and plastics vapor-deposited with metals such as aluminum.

The shape of the non-magnetic support can be a film, a tape, a sheet and the like, and various materials are selected depending upon the shape.

The present invention will be illustrated in more detail by the following Examples and Comparative Examples, but the present invention is not to be construed as being limited thereto. Unless otherwise indicated, all parts, percents and ratios are by weight.

EXAMPLES

The following composition was mixed and kneaded in a ball mill for 50 hours. The thus prepared coating composition was used as a magnetic layer in the Examples and Comparative Examples.

| | |
|---|---|
| Ferromagnetic Fe alloy particles (1500 Oe, BET specific surface area 50 m²/g) | 100 parts |
| Vinyl chloride copolymer | 10 parts |
| Polyurethane resin ("N2304", manufactured by Nippon Polyurethane Co., Ltd.) | 6 part |
| Butyl stearate | 1 part |
| Al₂O₃ (average particle size: 0.50 μm) | 2 parts |
| Carbon black (average particle size: 30 mμ) | 2 parts |
| Methyl ethyl ketone | 100 parts |
| Toluene | 120 parts |

After kneading and mixing the composition, 5 parts of polyisocyanate ("Collonate L", manufactured by Nippon Polyurethane Co., Ltd.) was added into the composition, which was mixed and kneaded in a ball mill for 10 minutes to obtain a coating composition for a magnetic layer. The resulting coating composition was diluted with toluene and was coated on a polyethylene terephthalate support having a thickness of 14 μm using a doctor blade in a dry thickness of 4 μm. Then, magnetic orientation was conducted and the coating composition was dried.

The following composition was mixed and kneaded in a ball mill for 50 hours to obtain a coating composition for a backing layer.

| | |
|---|---|
| Carbon black (secondary average particle diameter: 17 mμ, "Conductex SC", a trade name, manufactured by Nippon Columbia Carbon Co., Ltd.) | 100 parts |
| Vinyl copolymer (see Table 1) | 50 parts |
| Vinyl chloride copolymer (VAGH, Union Carbide Co., Ltd.) | 50 parts |
| Polyurethane resin ("N-2304", manufactured by Nippon Polyurethane Co., Ltd.) | 50 parts |
| Toluene | 50 parts |
| Methyl ethyl ketone | 700 parts |

After mixing and kneading the composition, 15 parts of ("Collonate L", manufactured by Nippon Polyurethane Co., Ltd.) was added; the mixture was mixed and kneaded in a ball mill for 10 minutes, the composition was coated on the opposite surface of a support to the magnetic layer in a dry thickness of 1 μm and dried. Calendering treatment was provided to smooth the surface of the magnetic layer and thermosetting treatment for the binder was conducted at 60° C. for 72 hours.

The thus prepared magnetic layer was slit to a ½ inch width to prepare a sample tape.

Sample tapes using the vinyl type copolymers as shown in Table 1 were prepared in Examples 1 to 9 and in the Comparative Example. The results of evaluations of those sample tapes are shown in Table 2.

EVALUATION

Video S/N

Using a video tape recorder "NV 8310" manufactured by Matsushita Electric Industrial Co., Ltd., grey signals at 50% set up were recorded and the noise was measured using a S/N meter "925 C Type" manufactured by Shibasoku. Video S/N is shown by a relative value when the video S/N of Example 1 is assigned a value of 0 dB.

Kinetic Friction Coefficient

Using the above video tape recorder, kinetic friction coefficient ($\mu$) was determined by the following equation, and the running tension was evaluated from $\mu$ value:

$$T_2/T_1 = \exp(\mu \times \pi)$$

where $T_1$ is the tape tension at the supply side of the rotary cylinder and $T_2$ is the tape tension at the take-up side of the rotary cylinder.

This test was done at 23° C. and 65% RH.

Measurements of Charging Potential

Sample tapes were run on the above described video tape recorder, and the charging potential of those tapes at the outlet of a rotary cylinder was measured using a surface potential meter "Model 344 Type" manufactured by TREK Co., Ltd.

Number of Drop Outs

After tapes were run for 100 passes on the above video tape recorder, the number of drop outs of $15 \times 10^{-6}$ sec or more was counted per 1 minute using a drop out counter "VD-3D" manufactured by Victor Company of Japan, Limited.

TABLE 1

| Copolymer containing a dialkylaminoalkyl group and a quaternary salt of a dialkylaminoalkyl group: | | | |
|---|---|---|---|
| | Vinyl compounds containing dialkylaminoalkyl group and a quaternary salt of dialkylamino alkyl group (wt %) | Copolymer compound (wt %) | |
| Example 1 | $CH_3=CH$<br>$\quad\mid$<br>$\quad COOC_2H_4N{\diagup CH_3 \atop \diagdown CH_3}$    20 | Ethylacrylate<br>Vinyl acetate | 75<br>5 |

TABLE 1-continued

Copolymer containing a dialkylaminoalkyl group and a quaternary salt of a dialkylaminoalkyl group:

| | Vinyl compounds containing dialkyl-aminoalkyl group and a quaternary salt of dialkylamino alkyl group (wt %) | | Copolymer compound (wt %) | |
|---|---|---|---|---|
| Example 2 | $CH_2=CH$<br>$\quad\vert$<br>$COOC_3H_6\overset{\oplus}{N}-CH_3\ NO_3^{\ominus}$<br>$\qquad\vert$<br>$\qquad CH_3$ — $CH_3$ | 30 | Ethylacrylate | 70 |
| Example 3 | $CH_2=CH \qquad CH_3$<br>$\quad\vert \qquad /$<br>$CONHC_3H_6\overset{\oplus}{N}-CH_3 \quad Cl^{\ominus}$<br>$\qquad\qquad\backslash$<br>$\qquad\qquad CH_3$ | 20 | Ethylacrylate | 80 |
| Example 4 | $\qquad\qquad CH_3$<br>$\qquad\qquad /$<br>$CH_2=C \qquad C_2H_5$<br>$\quad\vert \qquad /$<br>$CONHC_3H_6N$<br>$\qquad\qquad\backslash$<br>$\qquad\qquad C_2H_5$ | 30 | Butylacrylate<br>Hydroxyethyl methacrylate | 65<br>5 |
| Example 5 | $CH_2=CH \qquad CH_3$<br>$\quad\vert \qquad \vert$<br>$COOC_3H_6N$<br>$\qquad\quad\vert$<br>$\qquad\quad CH_3$ | 30 | Butylacrylate<br>Hydroxyethyl methacrylate | 65<br>5 |
| Example 6 | $\qquad\qquad CH_3$<br>$\qquad\qquad /$<br>$CH_2=C \qquad\qquad CH_3$<br>$\quad\vert \qquad\qquad /$<br>$NHCONHC_2H_4N$<br>$\qquad\qquad\qquad\backslash$<br>$\qquad\qquad\qquad CH_3$ | 20 | Methyl methacrylate<br>Vinyl acetate | 75<br>5 |
| Example 7 | $\qquad\qquad CH_3$<br>$\qquad\qquad /$<br>$CH_2=C \qquad\qquad CH_3$<br>$\quad\vert \qquad\qquad /$<br>$NHCOOC_3H_6N$<br>$\qquad\qquad\qquad\backslash$<br>$\qquad\qquad\qquad CH_3$ | 20 | Ethyl acrylate<br>Vinyl acetate | 75<br>5 |
| Example 8 | $CH_2=CH \qquad CH_3$<br>$\quad\vert \qquad /$<br>$COOC_2H_4N$<br>$\qquad\qquad\backslash$<br>$\qquad\qquad CH_3$ | 40 | Ethylacrylate<br>Acrylonitrile | 55<br>5 |
| Example 9 | " | 30 | Hexylacrylate<br>Butyl methacrylate | 65<br>5 |
| Comparative Example | Copolymer of vinyl chloride, vinyl acetate and vinyl alcohol (ratio of copolymerization 91:6:3, manufactured by Union Carbide Co., Ltd.) | | | |

TABLE 2

| Example | Video S/N (dB) | Charging potential (Volts) | Drop outs (Number/min.) | Kinetic friction coefficient |
|---|---|---|---|---|
| Example 1 | +0.3 | +5 | 15 | 0.30 |
| " 2 | +0.2 | +10 | 9 | 0.29 |
| " 3 | +0.4 | −5 | 9 | 0.29 |
| " 4 | +0.2 | +15 | 16 | 0.30 |
| " 5 | +0.5 | +10 | 10 | 0.28 |
| " 6 | +0.4 | −5 | 12 | 0.26 |
| " 7 | +0.3 | +30 | 7 | 0.27 |
| " 8 | +0.3 | +40 | 14 | 0.27 |
| " 9 | +0.2 | −10 | 21 | 0.25 |
| Comparative Example | 0 | −70 | 45 | 0.35 |

The magnetic tapes having a backing layer according to this invention as obtained in Examples 1 to 9 exhibited better video S/N characteristics than the magnetic tape having a conventional backing layer in the Comparative Example, and smaller charging potential (i.e., the absolute values were smaller), and as a result the number of drop outs of the tapes of this invention was reduced. The reason for this is considered to be that magnetic tapes having a backing layer of this invention are unlikely to be charged, and as a result, dust and contaminants hardly adhere to the tapes. Further, the effects of the backing layer of this invention were confirmed by the reduction of kinetic friction on coefficient.

While the invention has been described in detail and with reference to specific embodiments thereof, it will be apparent to one skilled in the art that various changes and modifications ca be made therein without departing from the spirit and scope thereof.

What is claimed is:

1. A magnetic recording medium comprising a nonmagnetic support having on one surface thereof a magnetic layer and on the opposite surface thereof a backing layer comprising non-magnetic particles dispersed in a binder containing a copolymer of (a) at least one of a vinyl monomer containing a dialkylaminoalkyl group and a vinyl monomer containing a quaternary salt of a dialkylaminoalkyl group, and (b) a copolymerizable vinyl monomer, and wherein said vinyl monomer containing a dialkylaminoalkyl group is represented by formula (I) and said vinyl monomer containing a quaternary salt of a dialkylaminoalkyl group is represented by formulae (II) or (III);

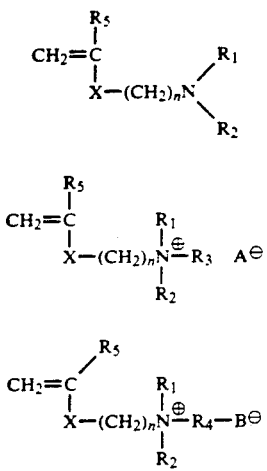

wherein $R_1$, $R_2$, $R_3$, which may be the same or different, each represents an alkyl group containing from 1 to 6 carbon atoms; $R_4$ represents an alkylene group containing from 1 to 6 carbon atoms; $R_5$ represents hydrogen or $CH_3$; X represents $-CO_2-$, $-CONH-$, $-NHCONH-$ OR $-NHCO_2$; $A^\ominus CL^\ominus$, $Br^\ominus$, $OPO_3R_6^\ominus$, $OSO_3R_6^\ominus$ or $NO_3^\ominus$; $R_6$ represents an alkyl group containing from 1 to 6 carbon atoms; $B^\ominus$ represents $-CO_2$ or $OPO_3^\ominus$; and n is an integer of from 1 to 4.

2. The magnetic recording medium as claimed in claim 1, wherein said copolymerizable vinyl monomer is selected from vinyl acetate, vinyl alcohol, maleic acid, maleic anhydride, acrylic acid, an acrylate, methacrylic acid, a methacrylate, acrylic acid substituted with a glycidyl group, an acrylate substituted with a glycidyl group, acrylonitrile, vinyl chloride, vinylidene chloride and vinyl propionate.

3. The magnetic recording medium as claimed in claim 1, wherein said copolymer comprises said vinyl monomer containing a dialkylaminoalkyl group or said vinyl monomer containing a quaternary salt of a dialkylaminoalkyl group in a total amount of from about 0.5 to 50 wt % of said copolymer.

4. The magnetic recording medium as claimed in claim 1, wherein said binder comprises said copolymer in an amount of from about 5 to 90 wt % of the total binder.

5. The magnetic recording medium as claimed in claim 4, wherein said binder further comprises a polyester resin or a polyurethane resin.

6. The magnetic recording medium as claimed in claim 1, wherein said non-magnetic particles dispersed in said binder are selected from carbon black, graphite and an inorganic filler selected from $TiO_2$, $TiO$, $ZnO$, $CaCO_3$, $CaO$, $SnO_2$, $SiO_2$, $\alpha$-$Al_2O_3$, $ZnS$, $MOS_2$, $BaSO_4$, $CaSO_4$, $MgCO_3$, $BN$ and $SiC$.

7. The magnetic recording medium as claimed in claim 6, wherein said carbon black has an average particle size of 10 to 300 m$\mu$ and said inorganic filler has an average particle size of from 0.1 to 10 $\mu$m.

8. The magnetic recording medium as claimed in claim 1, wherein said backing layer has a thickness of from 0.2 to 1.5 $\mu$m.

9. The magnetic recording medium as claimed in claim 1, wherein said vinyl monomer containing a quaternary salt of a dialkylaminoalkyl group is present in an amount from 0.5 to 40 weight % of said copolymer.

* * * * *